US012500682B2

(12) United States Patent
Azegami et al.

(10) Patent No.: US 12,500,682 B2
(45) Date of Patent: Dec. 16, 2025

(54) MULTIPLEXER AND IMAGING SYSTEM (71) Applicant: KOWA COMPANY, LTD., Nagoya (JP)

(72) Inventors: Tomohisa Azegami, Nagoya (JP); Tomoya Fukuda, Nagoya (JP)

(73) Assignee: KOWA COMPANY LTD., Nagoya (JP)

( * ) Notice: Subject to any disclaimer, the term of this patent is extended or adjusted under 35 U.S.C. 154(b) by 370 days.

(21) Appl. No.: 18/030,567

(22) PCT Filed: Oct. 7, 2021

(86) PCT No.: PCT/JP2021/037187
§ 371 (c)(1),
(2) Date: Apr. 6, 2023

(87) PCT Pub. No.: WO2022/091741
PCT Pub. Date: May 5, 2022

(65) Prior Publication Data
US 2023/0370186 A1    Nov. 16, 2023

(30) Foreign Application Priority Data

Oct. 29, 2020 (JP) ................................ 2020-181872

(51) Int. Cl.
*H04J 3/06* (2006.01)
*H04N 5/073* (2006.01)

(52) U.S. Cl.
CPC ......... *H04J 3/0652* (2013.01); *H04N 5/0736* (2013.01)

(58) Field of Classification Search
CPC ... H04J 3/0652; H04N 5/0736; H04N 7/0105; H04N 5/265; H04N 5/268; H04N 7/181;
(Continued)

(56) References Cited

U.S. PATENT DOCUMENTS 10,148,875 B1    12/2018   Chen
2004/0075741 A1    4/2004   Berkey et al.
(Continued)

FOREIGN PATENT DOCUMENTS

DE    102013106696 A1    12/2014
JP    2017050772 A    3/2017
(Continued)

OTHER PUBLICATIONS

International Search Report for PCT/JP2021/037187 dated Dec. 21, 2021.
(Continued)

*Primary Examiner* — Obaidul Huq
(74) *Attorney, Agent, or Firm* — MOSER TABOADA (57) ABSTRACT

Multiplexer according to the present invention includes: an input unit to which a plurality of image signals based on a first data communication standard are input, the image signals being acquired by respective imaging devices; an output unit that outputs an image signal based on a second data communication standard having a data transfer rate lower than that of the first data communication standard; and a storage unit that temporarily buffers the image signals input from the input unit. With such a multiplexer, it is possible to collectively convert the image data acquired by a plurality of imaging devices adopting a certain data communication standard into another data communication standard and suppress the data transfer delay caused by the conversion.

5 Claims, 3 Drawing Sheets

(58) Field of Classification Search
CPC ............... H04N 21/2383; H04N 23/90; H04N 21/2365; H04N 21/2381
USPC ........................................ 370/310, 345, 350
See application file for complete search history.

(56) References Cited

U.S. PATENT DOCUMENTS

| | | | |
|---|---|---|---|
| 2004/0151169 A1* | 8/2004 | Nelson | ............... H04L 12/40065 370/359 |
| 2009/0251601 A1 | 10/2009 | Ihlefeld et al. | |
| 2011/0242342 A1 | 10/2011 | Goma et al. | |
| 2016/0255600 A1* | 9/2016 | Hayami | ................ H04L 7/0091 370/350 |
| 2018/0088446 A1 | 3/2018 | Muraki et al. | |
| 2019/0124293 A1 | 4/2019 | Azegami et al. | |

FOREIGN PATENT DOCUMENTS

| | | | |
|---|---|---|---|
| KR | 101849853 B1 | 4/2018 |
| WO | WO 2017183706 A1 | 10/2017 |

OTHER PUBLICATIONS

AIA, EMVA and JIIA, for machine vision Interface standard Guide to Digital Camera Interface Selection, Jan. 2014, p. 1-24.
Extended European Search Report for Application No. 21885860.3 dated Oct. 9, 2024.

* cited by examiner

MULTIPLEXER AND IMAGING SYSTEM

TECHNICAL FIELD

The present invention relates to a multiplexer that outputs a plurality of signal inputs as one signal, and an imaging system using the multiplexer.

BACKGROUND ART

Conventionally, at manufacturing sites of industrial products such as semiconductors or in research institutes, universities, hospitals, etc., when transmitting image data captured by imaging devices such as industrial digital cameras to terminal devices (e.g., general-purpose personal computers, dedicated processing terminals, etc.), a mechanism called a multiplexer is used, which combines image data items captured by a plurality of imaging devices into one to output it or selects one from among such image data items to output it. For example, Patent Document 1 discloses a multiplexer that combines data received from a first camera and data received from a second camera and transmits the combined data to an external device.

Meanwhile, as disclosed in Non-Patent Document 1, various data communication standards are established as those for imaging devices as industrial digital cameras, and the features and device configurations of imaging devices may be different depending on the adopted data communication standard. For example, an industrial digital camera conforming to "GigE Vision," one of the data communication standards, is required to have a frame buffer on the data transmission side, and the housing is required to have a relatively large size because a large power supply circuit is configured such that the power source inside the camera is composed of a 48 V superimposed power source via a transformer, resulting in a large amount of heat of the device, but there is a feature that the camera is easy to use because it can be connected directly to a terminal device such as a personal computer via a LAN cable. On the other hand, an industrial digital camera conforming to "CoaXPress," another data communication standard, requires a small power supply circuit because the power source inside the camera is composed of a 24 V superimposed power source without via a transformer, and there is no need to provide a frame buffer; therefore, the housing can be smaller than that of an industrial digital camera that adopts the "GigE Vision" standard. Thus, the camera conforming to "CoaXPress" has an advantage that it can be used even when the installation environment of the camera is restricted, but it has a disadvantageous feature that a grabber board is required on the receiving side of image data in order to process the image data with the terminal device.

In a system in which the image data acquired by imaging devices such as industrial digital cameras is transmitted to a terminal device such as a personal computer for image processing or image display, the feature that the imaging devices can be connected directly to the terminal device is considered, and in general, imaging devices conforming to the "GigE Vision" standard are often adopted.

PRIOR ART DOCUMENTS

Patent Document

[Patent Document 1] WO2017/183706

Non-Patent Document

[Non-Patent Document 1] "Interface Standard for Machine Vision" (published in January 2014, Japan Industrial Imaging Association, http://jiia.org/wp-content/themes/jiia/pdf/fsf.pdf)

SUMMARY OF THE INVENTION

Problems to be Solved by the Invention

On the other hand, when the installation space of the imaging device is restricted, there is a need to adopt an imaging device with a small housing, for example, an industrial digital camera conforming to the "CoaXPress" standard. In order to receive image data by the terminal device when an imaging device conforming to the "CoaXPress" standard is adopted as above, a conceivable method is to separately prepare a grabber board for "CoaXPress" or convert the image data to match another medium possessed by the host side device, such as "GigE Vision," but the method of separately preparing a grabber board for "CoaXPress" has a problem in an increased cost, while the method of using a conversion device has a problem in that, in a system using a plurality of imaging devices, preparing a unit for the conversion for each of the imaging devices results in a large cost increase.

Moreover, the data transfer rates defined in the data communication standards are different. For example, when the data communication standard of imaging devices is "CoaXPress," the data transfer rate is standardized to 1.25 Gbps (effective transfer rate is about 1 Gbps) even when transferring the image data at the lowest rate. On the other hand, in the "GigE Vision" standard, the maximum data transfer rate is 1 Gbps (effective transfer rate is about 900 Mbps), so there is a problem in that when performing interface conversion of the image data from the "CoaXPress" to the "GigE Vision," the communication band will lack. In particular, when the image data transmitted from a plurality of imaging devices are collectively transmitted to a single terminal device, the lack of communication band will be more significant.

The present invention has been made in view of the above problems, and an object of the present invention is to provide a multiplexer that can collectively convert image data acquired by a plurality of imaging devices adopting a certain data communication standard into another data communication standard and that can suppress the data transfer delay caused by the conversion. Another object of the present invention is to provide an imaging system including a plurality of such multiplexers and capable of suppressing the occurrence of differences in the imaging timing.

Means for Solving the Problems

To achieve the above objects, first, the present invention provides a multiplexer comprising: an input unit to which a plurality of image signals based on a first data communication standard are input, the image signals being acquired by respective imaging devices; an output unit that outputs an image signal based on a second data communication standard having a data transfer rate lower than that of the first data communication standard; a processing unit that converts the image signals based on the first data communication standard input to the input unit into the image signal based on the second data communication standard; and a storage unit that temporarily buffers the image signals input from the input unit (Invention 1).

According to the invention (Invention 1), in a system using a plurality of imaging devices adopting the first data communication standard, when converting into the second data communication standard having a data transfer rate lower than that of the first data communication standard, the image data from the plurality of imaging devices can be subjected to interface conversion with a single unit without preparing a unit for the conversion for each of the imaging devices. Moreover, even when the data transfer rate of the first data communication standard is higher than the data transfer rate of the second data communication standard, the input image data can be temporarily stored in the storage unit, and it is therefore possible to avoid the overflow due to the lack of bandwidth on the output side. Thus, since the image data acquired by the plurality of imaging devices adopting the first data communication standard can be collectively converted into the second data communication standard, the suppression of a delay in the data transfer due to the conversion is achieved.

In the above invention (Invention 1), the first data communication standard may be CoaXPress, and the second data communication standard may be GigE Vision (Invention 2).

According to the invention (Invention 2), the image data inputs from a plurality of imaging devices conforming to the "CoaXPress" standard can be received, and the data to be transmitted to a terminal device for image processing can be output in the "GigE Vision" standard; therefore, it is possible to construct an imaging system with a high degree of freedom in the installation location of the imaging devices and a simple device configuration.

In the above invention (Invention 1, 2), when each of the imaging devices is assumed to be an n-th imaging device (n=1 to m) and packet data input from the n-th imaging device (n=1 to m) to the input unit is n-th packet data (n=1 to m), the output unit may sequentially output an image signal based on the second data communication standard converted from first packet data input from a first imaging device to the input unit to an image signal based on the second data communication standard converted from m-th packet data input from an m-th imaging device to the input unit, and the n-th packet data (n=1 to m) may be data smaller than image data for one screen captured by the n-th imaging device (n=1 to m) (Invention 3).

In the above invention (Invention 3), the n-th packet data (n=1 to m) may be image data for one pixel, a plurality of pixels, one line, or a plurality of lines that constitute one screen captured by the n-th imaging device (n=1 to m) (Invention 4).

When images are captured at the same time by a plurality of imaging devices, the image data is input at the same time to the input unit from respective imaging devices. If the image data is subjected to the interface conversion and output after the image data for one screen captured by each of the imaging devices is accumulated, then, as the number of images captured at the same time increases, the synchronicity of the captured images is lost and the transfer timing of the image data is delayed. According to the invention (Invention 3, 4), the image data can be sequentially output in a unit smaller than the image data for one screen captured by each of the imaging devices, such as in a unit of packet data input to the input unit from each of the imaging devices, in a unit of one pixel constituting one screen captured by each of the imaging devices, in a unit of a plurality of pixels constituting the one screen, in a unit of one line constituting the one screen, or in a unit of a plurality of lines constituting the one screen, and the image data can thereby be subjected to the interface conversion and output without waiting that the image data for one screen captured by each of the imaging devices is accumulated; therefore, the image data can be transferred without losing the synchronicity of the captured images as much as possible, and the delay in the transfer timing of the image data can be suppressed.

Second, the present invention provides an imaging system having a plurality of multiplexers described as the above invention 1 to 4, the plurality of imaging devices being connected to each of the multiplexers, the imaging system comprising a synchronization means that synchronizes respective times of the multiplexers (Invention 5).

Depending on the data communication standard for image data, there are those, such as the "GigE Vision" standard, in which the delay time due to the transmission path is not ensured. In a system including a plurality of multiplexers and a plurality of imaging devices connected to each of the multiplexers, if the multiplexers and a terminal device for image processing are connected in accordance with such a data communication standard, when an attempt is made to perform simultaneous imaging with the plurality of imaging devices connected to each of the multiplexers, a difference will occur in the imaging timing by a difference in the delay time in each multiplexer system. According to the invention (Invention 5), respective times of the plurality of multiplexers are synchronized by the synchronization means, and the respective times of the plurality of imaging devices connected to each multiplexer are thereby also synchronized, and it is possible to achieve simultaneous imaging with these imaging devices without causing differences in the imaging timing.

In the above invention (Invention 5), the synchronization means may preferably synchronize the respective times of the multiplexers using a time synchronization protocol (Invention 6).

According to the invention (Invention 6), the time of the entire system can be synchronized by using the time of any one of the multiplexers and imaging devices constituting the system or the time of a terminal device connected to the system for image processing without separately providing inside the system a mechanism for transmitting a synchronization signal to the multiplexers.

Advantageous Effect of the Invention

According to the multiplexer of the present invention, it is possible to collectively convert the image data acquired by a plurality of imaging devices adopting a certain data communication standard into another data communication standard and suppress the data transfer delay caused by the conversion.

EMBODIMENTS FOR CARRYING OUT THE INVENTION

Hereinafter, one or more embodiments of the present invention will be described in detail with reference to the drawings. The embodiments described below are examples, and the present invention limited to these embodiments.

Figure 1:
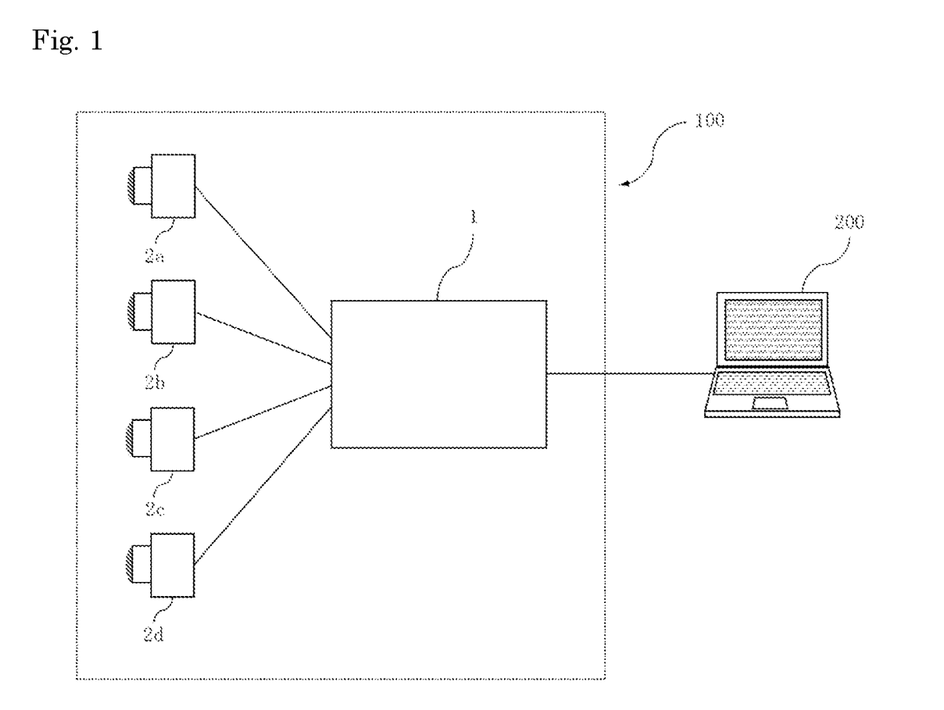
FIG. 1 is a schematic configuration diagram of an imaging system including a multiplexer according to an embodiment of the present invention.

FIG. 1 is a schematic configuration diagram of an imaging system 100 including a multiplexer 1 according to an embodiment of the present invention. The imaging system 100 is configured such that a plurality of imaging devices 2 are connected to an input unit 11 of the multiplexer 1 via cables. In the present embodiment, four imaging devices 2 (2a, 2b, 2c, and 2d) are connected to the multiplexer 1. Specifically, the input unit 11 of the multiplexer 1 is composed of four input units: a first input unit 11a, a second input unit 11b, a third input unit 11c, and a fourth input unit 11d, and the four imaging devices 2a, 2b, 2c, and 2d are connected to the first input unit 11a, the second input unit 11b, the third input unit 11c, and the fourth input unit 11d, respectively. A terminal device 200 is connected to an output unit 14 of the multiplexer 1, and the imaging system 100 is thereby configured such that the image data acquired by the imaging devices 2 can be transferred to the terminal device 200. The number of the imaging devices 2 connected to the multiplexer 1 is not particularly limited, provided that the number is plural, and the number of input units 11 provided in the multiplexer 1 is also not particularly limited, provided that the number is plural. It is permissible that the number of the imaging devices 2 connected to the multiplexer 1 is smaller than the number of the input units 11 provided in the multiplexer 1 (i.e., the input units 11 may include one or more input units to which the imaging devices 2 are not connected).

In the present embodiment, each imaging device 2 is an industrial digital camera conforming to the "CoaXPress" standard, and the four imaging devices 2 (2a, 2b, 2c, and 2d) are connected to the first input unit 11a, second input unit 11b, third input unit 11c, and fourth input unit 11d of the multiplexer 1, respectively, using general-purpose coaxial cables. Lighting devices (not illustrated) that illuminate respective imaging targets are connected to the four imaging devices 2 (2a, 2b, 2c, and 2d), and lighting control signals for controlling on/off of the lighting are transmitted from the terminal device 200 to the lighting devices through the multiplexer 1 and the imaging devices 2.

The terminal device 200 performs image processing and image display based on the image data transmitted from the imaging system 100 and also outputs to the imaging system 100 the control signals for controlling the imaging devices 2 and lighting devices constituting the imaging system 100. The terminal device 200 may be, for example, a general-purpose personal computer, or an operating terminal dedicated to the imaging system 100. The terminal device 200 is configured to be able to receive the image data output in accordance with the "GigE Vision" standard and is connected to the output unit 14 of the multiplexer 1 via a general-purpose LAN cable. An operator of the imaging system 100 can operate the terminal device 200 thereby to issue various instructions to the imaging system 100.

Figure 2:
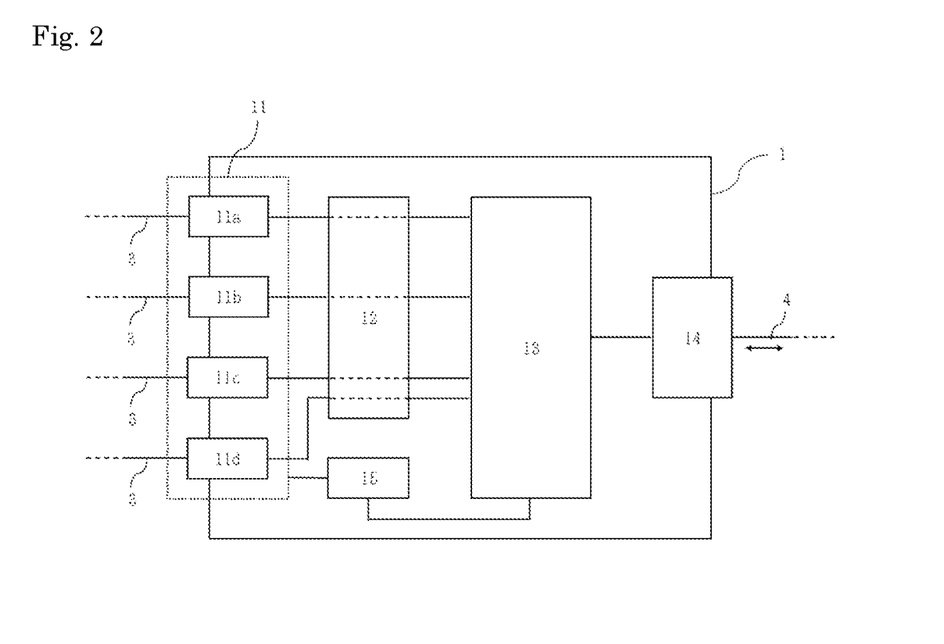
FIG. 2 is a schematic configuration diagram of the multiplexer according to the embodiment.

As illustrated in FIG. 2, the multiplexer 1 according to the present embodiment includes the input unit 11 to which a plurality of image signals based on a first data communication standard acquired by respective imaging devices are input, an output unit 14 that outputs an image signal based on a second data communication standard having a data transfer rate lower than that of the first data communication standard, a processing unit 13 that converts the image signals based on the first data communication standard input to the input unit 11 into the image signal based on the second data communication standard, a storage unit 12 that temporarily buffers the image signals input from the input unit 11, and a power supply unit 15 that supplies power to the four imaging devices 2 (2a, 2b, 2c, and 2d) connected to the multiplexer 1. In the present embodiment, the first data communication standard is the "CoaXPress" standard, and the second data communication standard is the "GigE Vision" standard.

The input unit 11 is composed of four input units: the first input unit 11a, the second input unit 11b, the third input unit 11c, and the fourth input unit 11d which are assigned to the four imaging devices 2 (2a, 2b, 2c, and 2d), respectively. The first input unit 11a, the second input unit 11b, the third input unit 11c, and the fourth input unit 11d each have an interface structure (connector) adopted by the "CoaXPress" standard, and the four imaging devices 2 (2a, 2b, 2c, and 2d) are connected thereto via coaxial cables.

The storage unit 12 is a memory device, so-called a frame memory, for storing the image data of one screen which s input from the input unit 11, and may be implemented as a DRAM or SRAM. In the present embodiment, the storage unit 12 independently stores the image data which is input from the first input unit 11a, the second input unit 11b, the third input unit 11c, and the fourth input unit 11d, and independently outputs the image data to the processing unit 13, which will be described below.

The processing unit 13 is a processor for performing a conversion process/combining process on the image data and control of the imaging devices 2 and may be implemented as an FPGA, a CPU, or the like. The processing unit 13 provides, for example, various processes for the image signals input from the imaging devices 2 and functions such as transmission and reception of control signals to and from the imaging devices 2, control of the power supply to the imaging devices 2, and on/off control for the lighting devices. In the present embodiment, the processing unit 13 can convert a plurality of image data items based on the "CoaXPress" standard input to the input unit 11 into image data based on the "GigE Vision" standard. Additionally or alternatively, the processing unit 13 can combine two or more image data items of the image data, which is input from the first input unit 11a, the second input unit 11b, the third input unit 11c, and the fourth input unit 11d, to generate combined image data. Additionally or alternatively, the processing unit 13 can transmit control signals for giving imaging instructions or the like to the imaging devices 2 based on the control signals received from the terminal device 200.

The output unit 14 outputs the image data, which is converted to the "GigE Vision" standard by the processing unit 13, to the outside of the multiplexer 1. The output unit 14 has an interface structure (connector) adopted by the "GigE Vision" standard and is connected to the terminal device 200 via a LAN cable.

The power supply unit 15 is a power supply circuit that outputs power to be supplied to the imaging devices 2 (2a, 2b, 2c, and 2d).

The processing unit 13 of the multiplexer 1 can receive the control signal, which is transmitted from the terminal device 200 by the operator operating the terminal device 200, via the output unit 14 and transmit, based on the received control signal, a control signal to each imaging device 2 so that the imaging devices 2 (2a, 2b, 2c, and 2d) achieve the following functions.

(1) Any one imaging device 2 of the four imaging devices 2 (2a, 2b, 2c, and 2d) is controlled to capture an image.

(2) Any two or more imaging devices 2 of the four imaging devices 2 (2a, 2b, 2c, and 2d) are controlled to capture images at the same time.

(3) The imaging device or devices 2 which capture an image or images are switched.

According to the multiplexer 1 as described above, in the system using the four imaging devices 2 adopting the "CoaXPress" standard (first data communication standard), when converting into the "GigE Vision" standard (second data communication standard) having a data transfer rate lower than that of the "CoaXPress" standard, the image data from the four imaging devices 2 can be subjected to the interface conversion with a single unit without preparing a unit for the conversion for each of the four imaging devices 2. Moreover, even when the data transfer rate of the "CoaXPress" standard is higher than the data transfer rate of the "GigE Vision" standard, the input image data can be temporarily stored in the storage unit 12, and it is therefore possible to avoid the lack of bandwidth on the output side. Thus, the image data acquired by the four imaging devices 2 conforming to the "CoaXPress" standard can be collectively converted into the "GigE Vision" standard, suppression of a delay in the data transfer due to the conversion is achieved.

Moreover, by making use of such a multiplexer 1, the image data inputs from the plurality of imaging devices 2 conforming to the "CoaXPress" standard can be received, and the data to be transmitted to the terminal device 200 can be output in the "GigE Vision" standard; therefore, it is possible to construct the imaging system 100 with a high degree of freedom in the installation location of the imaging devices 2 and a simple device configuration.

When images are captured at the same time by the plurality of imaging devices 2, the image data is input at the same time to the input unit 11 of the multiplexer 1 from respective imaging devices 2. If the image data is subjected to the interface conversion and output after the image data for one screen captured by each imaging device 2 is accumulated, then, as the number of images captured at the same time increases, the synchronicity of the captured images is lost and the transfer timing of the image data is delayed. To solve such a problem, the multiplexer 1 according to the present embodiment is configured such that the output unit 14 outputs the image signal based on the second data communication standard ("GigE Vision") in a line unit of an image composed of the image signals based on the first data communication standard ("CoaXPress"). When such a multiplexer 1 is used to collectively transmit the image data, for example, from the four imaging devices 2 (2a, 2b, 2c, and 2d) to the terminal device 200, the delay can be suppressed by repeating the transmission of image data in a set of four lines, rather than sequentially transmitting the image data in a complete form of one screen.

Specifically, when the image data for one image composed of N lines is input at the same time to the input unit 11 from the first imaging device 2a, the second imaging device 2b, the third imaging device 2c, and the fourth imaging device 2d, the output unit 14 outputs in series the image data based on the "GigE Vision" standard corresponding to the image data for an M-th line (M=1 to N) input from the first imaging device 2a to the input unit 11a, the image data based on the "GigE Vision" standard corresponding to the image data for the M-th line (M=1 to N) input from the second imaging device 2b to the input unit 11b, the image data based on the "GigE Vision" standard corresponding to the image data for the M-th line (M=1 to N) input from the third imaging device 2c to the input unit 11c, and the image data based on the "GigE Vision" standard corresponding to the image data for the M-th line (M=1 to N) input from the fourth imaging device 2d to the input unit 11d.

Figure 3:
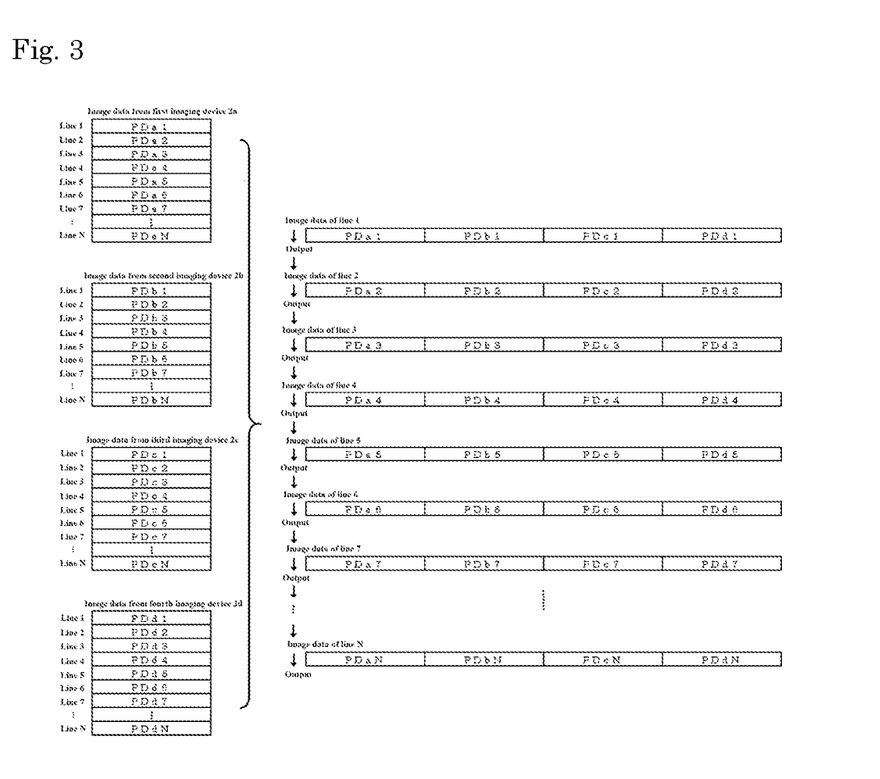
FIG. 3 is a schematic diagram for describing the content of image data processing in the multiplexer.

As illustrated in FIG. 3, when the image data input from the first imaging device 2a to the input unit 11a is image data for one image composed of N lines, it is assumed that the image data of line 1 is PDa1, the image data of line 2 is PDa2, the image data of line 3 is PDa3, . . . , and the image data of line N is PDaN. Likewise, in the image data input from the second imaging device 2b to the input unit 11b, it is assumed that the image data of line 1 is PDb1, the image data of line 2 is PDb2, the image data of line 3 is PDb3, . . . , and the image data of line N is PDbN, in the image data input from the third imaging device 2c to the input unit 11c, it is assumed that the image data of line 1 is PDc1, the image data of line 2 is PDc2, the image data of line 3 is PDc3, . . . , and the image data of line N is PDcN, and in the image data input from the fourth imaging device 2d to the input unit 11d, it is assumed that the image data of line 1 is PDd1, the image data of line 2 is PDd2, the image data of line 3 is PDd3, . . . , and the image data of line N is PDdN.

Here, the processing unit 13 of the multiplexer 1 outputs the image data PDa1 of line 1 input from the first imaging device 2a to the input unit 11a, the image data PDb1 of line 1 input from the second imaging device 2b to the input unit 11b, the image data PDc1 of line 1 input from the third imaging device 2c to the input unit 11c, and the image data PDd1 of line 1 input from the fourth imaging device 2d to the input unit 11d from the output unit 14 as one set, and after that, repeatedly generates the image data set for line 2 (PDa2, PDb2, PDc2, and PDd2), the image data set for line 3 (PDa3, PDb3, PDc3, and PDd3), . . . and outputs them from the output unit 14. With such processing, by outputting the image data in a line unit of an image, the image data can be subjected to the interface conversion and output each time the image data for one line is accumulated without waiting that the image data for one screen captured by each imaging device 2 is accumulated, and the delay in the transfer timing of the image data can therefore be suppressed.

The output of an image signal in a line unit of an image has been described for an example in which the image data for one image composed of N lines is input at the same time from the first imaging device 2a, the second imaging device 2b, the third imaging device 2c, and the third imaging device 2c, but the delay in the transfer timing of image data can be suppressed by performing the same processing also when images are captured at the same time, for example, with two or three imaging devices 2 among the four imaging devices 2. That is, when the imaging system 100 includes at least two imaging devices 2 and the image signals for one image composed of N lines are input at the same time from the at least two imaging devices 2 to the input unit 11, it is possible to suppress the delay in the transfer timing of the image data as long as the output unit 14 outputs in series the image data based on the "GigE Vision" standard corresponding to the image data for an M-th line (M=1 to N) input from one imaging device 2 to the input unit 11 and the image data based on the "GigE Vision" standard corresponding to the image data for the M-th line (M=1 to N) input from another imaging device 2 to the input unit 11.

The above description has been made on the assumption that the four imaging devices 2 (2a, 2b, 2c, and 2d) are connected to the multiplexer 1, but the number of imaging devices 2 connected to the multiplexer 1 is of course not limited to this, and the same processing is also possible, provided that a plurality of imaging devices 2 are connected. That is, the multiplexer 1 according to the present embodiment may be configured such that when each of the plurality of imaging devices 2 is assumed to be an n-th imaging device (n=1 to m) and packet data of the image data input from the n-th imaging device (n=1 to m) to the input unit 11 is n-th packet data (n=1 to m), the output unit 14 sequentially outputs an image signal based on the second data communication standard converted from first packet data input from a first imaging device to the input unit 11 to an image signal based on the second data communication standard converted from m-th packet data input from an m-th imaging device to the input unit 11. When the n-th packet data (n=1 to m) is data smaller than the image data for one screen captured by the n-th imaging device (n=1 to m), the image data can be sequentially subjected to the interface conversion and output without waiting that the image data for one screen captured by each of the imaging devices 2 is accumulated; therefore, the image data can be transferred without losing the synchronicity of the captured images as much as possible, and the delay in the transfer timing of the image data can be suppressed.

Also in the above description, by outputting in series the image data for one line captured by each imaging device 2, the image data is subjected to the interface conversion and output each time the image data for one line is accumulated without waiting that the image data for one screen captured by each imaging device 2 is accumulated, but the image data for one pixel, a plurality of pixels, or a plurality of lines that constitute one screen captured by each imaging device 2 may also be transmitted in series. For example, the output unit 14 may output an image signal of the second data communication standard corresponding to the image data for four pixels input from the first imaging device 2a to the input unit 11, then output an image signal of the second data communication standard corresponding to the image data for four pixels input from the second imaging device 2b to the input unit 11, then output an image signal of the second data communication standard corresponding to the image data for four pixels input from the third imaging device 2c to the input unit 11, and then output an image signal of the second data communication standard corresponding to the image data for four pixels input from the fourth imaging device 2d to the input unit 11, or the output unit 14 may output an image signal of the second data communication standard corresponding to the image data for one pixel input from the first imaging device 2a to the input unit 11, then output an image signal of the second data communication standard corresponding to the image data for three pixels input from the second imaging device 2b to the input unit 11, then output an image signal of the second data communication standard corresponding to the image data for five pixels input from the third imaging device 2c to the input unit 11, and then output an image signal of the second data communication standard corresponding to the image data for seven pixels input from the fourth imaging device 2d to the input unit 11, or the output unit 14 may be permitted to output an image signal of the second data communication standard corresponding to the image data for five pixels input from the first imaging device 2a to the input unit 11, then output an image signal of the second data communication standard corresponding to the image data for one line input from the second imaging device 2b to the input unit 11, then output an image of the second data signal communication standard corresponding to the image data for five pixels input from the third imaging device 2c to the input unit 11, and then output an image signal of the second data communication standard corresponding to the image data for half line input from the fourth imaging device 2d to the input unit 11. In other words, provided that the n-th packet data (n=1 to m), which is the packet data of the image data input from the n-th imaging device (n=1 to m) to the input unit 11, is data smaller than the image data for one screen captured by the n-th imaging device (n=1 to m), the delay in the transfer timing of the image data can be suppressed, so the size of the image data which is output in series from the output unit 14 may be unified or may not be unified.

Figure 4:
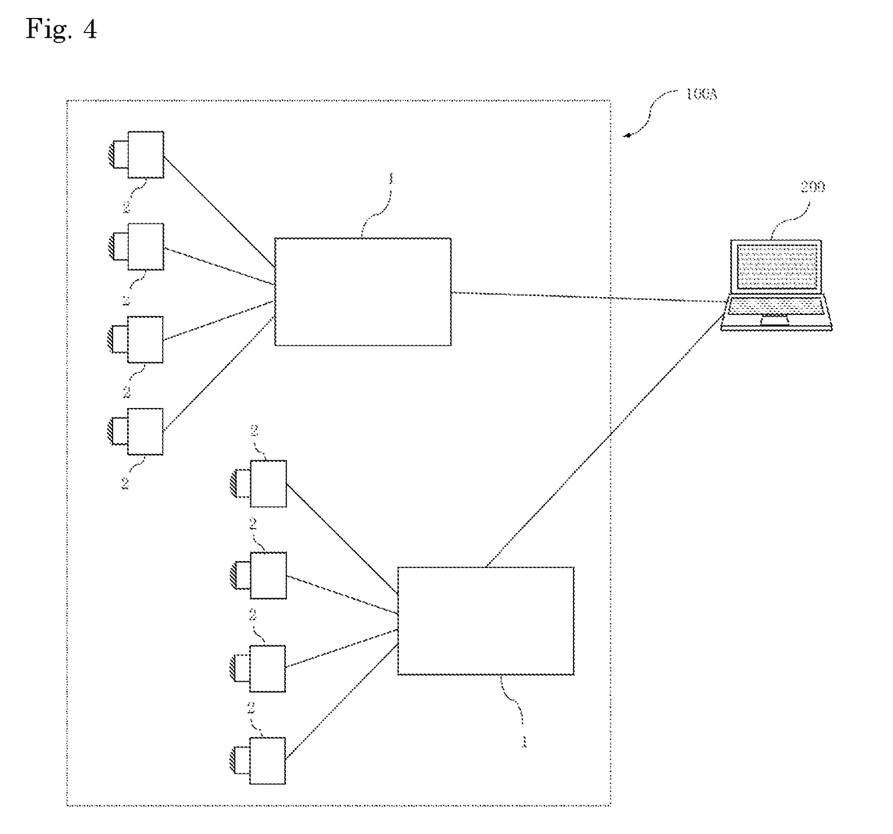
FIG. 4 is a schematic configuration diagram of an imaging system including two multiplexers according to the embodiment.

The description will then be directed to a mechanism for suppressing the occurrence of differences in the imaging timing in an imaging system 100A including two multiplexers 1A and 1B.

Depending on the data communication standard for image data, there are those, such as the "GigE Vision" standard, in which the delay time due to the transmission path is not ensured. In a system including a plurality of multiplexers 1 and a plurality of imaging devices 2 connected to each of the multiplexers 1, if the multiplexers 1 and the terminal device 200 are connected in accordance with such a data communication standard, when an attempt is made to perform simultaneous imaging with the plurality of imaging devices 2 connected to each of the multiplexers, a difference will occur in the imaging timing by a difference in the delay time in each multiplexer system. To solve such a problem, when constructing an imaging system having a plurality of multiplexers 1 as described above and a plurality of imaging devices 2 connected to each of the multiplexers 1, it is preferred to provide the system with a synchronization means that synchronizes respective times of the multiplexers 1. Respective times of the plurality of multiplexers 1 are thus synchronized by the synchronization means, and the respective times of the plurality of imaging devices 2 connected to each multiplexer 1 are thereby also synchronized, and it is possible to achieve simultaneous imaging with these imaging devices 2 without causing differences in the imaging timing.

A specific example of an imaging system including the synchronization means be described below. As illustrated in FIG. 4, the imaging system 100A has two multiplexers 1A and 1B, and four imaging devices 2 are connected to the input side of each of the two multiplexers 1A and 1B. The output sides of the multiplexers 1A and 1B are both connected to the terminal device 200. That is, in the imaging system 100A, there are two systems of imaging lines: an imaging line composed of the multiplexer 1A and the four imaging devices 2; and an imaging line composed of the multiplexer 1B and the four imaging devices 2. In the present embodiment, the two multiplexers 1 are included in the imaging system 100A and the four imaging devices 2 are connected to each multiplexer 1, but the present invention is not limited to this, and three or more multiplexers 1 may be provided, and/or the number of imaging devices 2 connected to each multiplexer 1 may be two, three, or five or more.

The imaging system 100A uses a time synchronization protocol PTP (Precision Time Protocol) as the synchronization means. By performing the time synchronization within the network of the imaging system 100A using the time synchronization protocol PTP, the time of the entire imaging system 100A can be synchronized using any one of the times of the multiplexers 1A and 1B and imaging devices 2 which constitute the imaging system 100A or the time of the terminal device 200 connected to the imaging system 100A without separately providing inside or outside the imaging system 100A a mechanism for transmitting a synchronization signal to the multiplexers 1.

In the time synchronization using the time synchronization protocol PTP, at least any one of the multiplexers 1A and 1B and imaging devices 2 which constitute the imaging system 100A and the terminal device 200 connected to the imaging system 100A serves as a master device, and the others serve as slave devices. The master device is a time providing device, and each slave device synchronizes its own time with the time of the master device.

For example, when one multiplexer 1A is the master device, a time signal is transmitted at a certain time T1 for time synchronization from the multiplexer 1A to the slave devices, that is, from the multiplexer 1A to the multiplexer 1B and eight imaging devices 2 which constitute the imaging system 100A and the terminal device 200 connected to the imaging system 100A. On the basis of the time signal, each slave device measures the network delay and calibrates its own clock. The specific clock calibration method is a known one, and the description will be omitted herein.

When the times of the multiplexer 1B and the terminal device 200 are synchronized with the time of the multiplexer 1A which is the master device, the terminal device 200 may preliminarily transmit commands to the multiplexer 1A and the multiplexer 1B so that they transmit a trigger signal for starting the imaging at a predetermined time to the imaging devices 2 to which the multiplexer 1A and the multiplexer 1B are connected, and the imaging devices 2 can thereby perform the imaging at the same time at the predetermined time, thus realizing the simultaneous imaging by the plurality of imaging devices 2 without causing differences in the imaging timing.

The configuration for synchronizing the time using the time synchronization protocol PTP is an example of the synchronization means in the present invention, and the synchronization means is not limited to this, provided that the times of the two multiplexers 1 included in the imaging system 100A can be synchronized. For example, a mechanism for transmitting a trigger signal for time synchronization to the two multiplexers 1 may be separately provided, and the times of the two multiplexers 1 may be synchronized based on the trigger signal from the mechanism, or a configuration in which the time is synchronized using a time synchronization protocol NTP (Network Time Protocol) may be adopted.

While the multiplexer 1 and the imaging systems 100 and 100A each using the multiplexer 1 according to the present invention have been heretofore described, the present invention is not limited to the above embodiments, and various modifications can be carried out. For example, in the present embodiment, the first data communication standard is the "CoaXPress" standard and the second data communication standard is the "GigE Vision" standard, but the data communication standards are not necessarily limited to them, and provided that the data transfer rate of the second data communication standard is lower than that of the first data communication standard, the same effects as those of the multiplexer 1 according to the present embodiment can be expected by using a multiplexer having the same configuration.

DESCRIPTION OF REFERENCE NUMERALS 100, 100A Imaging system
1 Multiplexer
11 Input unit
11a First input unit
11b Second input unit
11c Third input unit
11d Fourth input unit
12 Storage unit
13 Processing unit
14 Output unit
15 Power supply unit
2 Imaging device
2a First imaging device
2b Second imaging device
2c Third imaging device
2d Fourth imaging device
3 Coaxial cable
4 LAN cable
200 Terminal device

The invention claimed is:

1. A multiplexer comprising:
an input unit to which a plurality of image signals based on a first data communication standard are input, the image signals being acquired by respective imaging devices;
an output unit that outputs an image signal based on a second data communication standard having a data transfer rate lower than that of the first data communication standard;
a processing unit that converts the image signals based on the first data communication standard input to the input unit into the image signal based on the second data communication standard; and
a storage unit that temporarily buffers the image signals input from the input unit;
wherein when each of the imaging devices is assumed to be an n-th imaging device (n=1 to m) and packet data input from the n-th imaging device (n=1 to m) to the input unit is n-th packet data (n=1 to m),
the output unit sequentially outputs an image signal based on the second data communication standard converted from first packet data input from a first imaging device to the input unit to an image signal based on the second data communication standard converted from m-th packet data input from an m-th imaging device to the input unit, and
the n-th packet data (n=1 to m) is data smaller than image data for one screen captured by the n-th imaging device (n=1 to m).

2. The multiplexer according to claim 1, wherein
the first data communication standard is a coaxial express (CoaXPress) communication standard, and
the second data communication standard is a Gigabit Ethernet (GigE) Vision communication standard.

3. The multiplexer according to claim 1, wherein the n-th packet data (n=1 to m) is image data for one pixel, a plurality of pixels, one line, or a plurality of lines that constitute one screen captured by the n-th imaging device (n=1 to m).

4. An imaging system having a plurality of multiplexers according to claim 1, the plurality of imaging devices being connected to each of the multiplexers, the imaging system comprising
a synchronization means that synchronizes respective times of the multiplexers.

5. The imaging system according to claim 4, wherein the synchronization means synchronizes the respective times of the multiplexers using a time synchronization protocol.

* * * * *